Dec. 1, 1953    J. K. BABLES    2,661,043
VEHICLE WHEEL CONTAINING SHOCK ABSORBING SPRINGS
Filed June 18, 1951
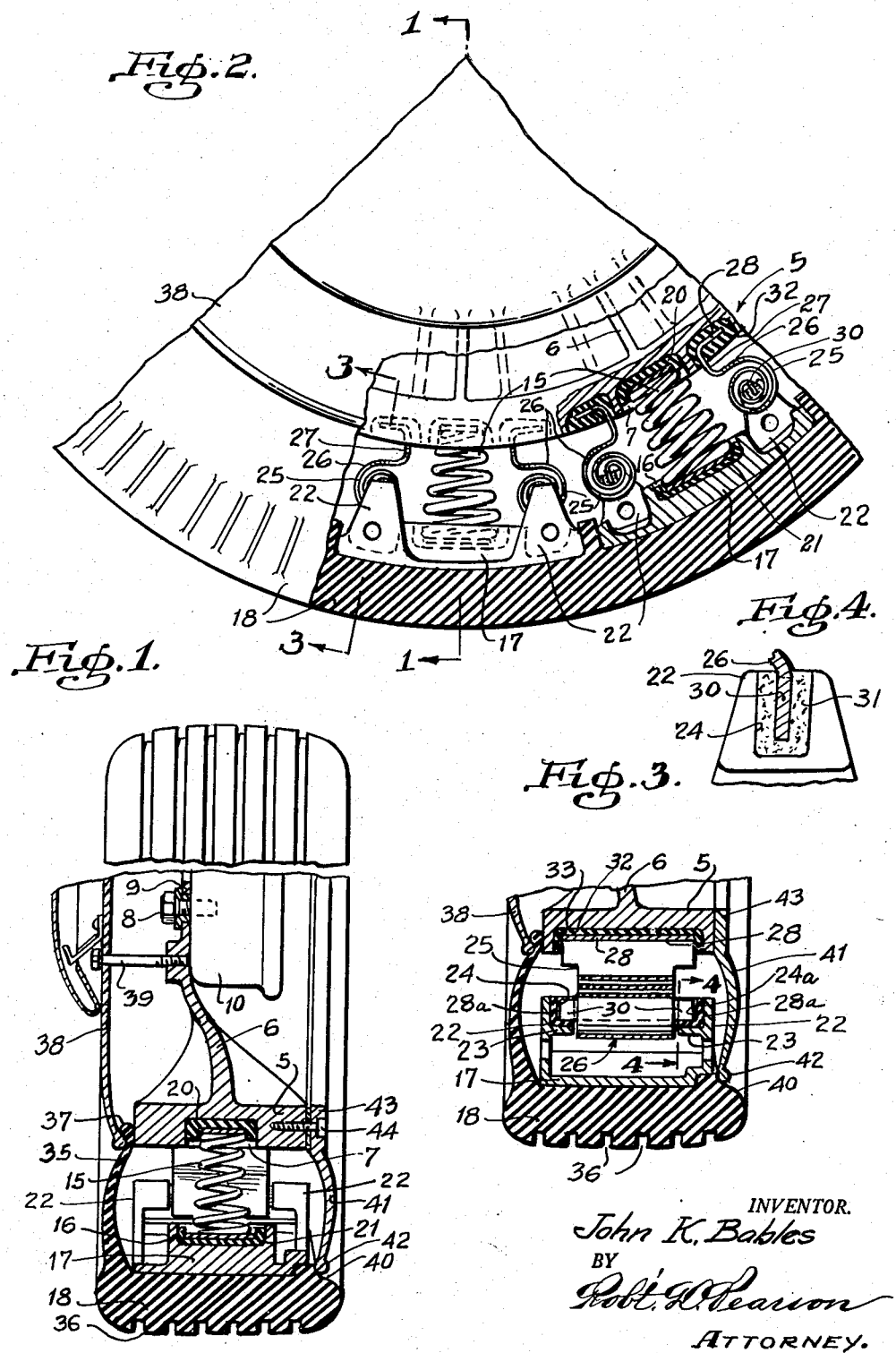
INVENTOR.
John K. Bables
BY
Robt. H. Pearson
ATTORNEY.

Patented Dec. 1, 1953

2,661,043

UNITED STATES PATENT OFFICE 2,661,043

VEHICLE WHEEL CONTAINING SHOCK ABSORBING SPRINGS

John K. Bables, Los Angeles, Calif.

Application June 18, 1951, Serial No. 232,200

14 Claims. (Cl. 152—247)

1

This invention relates to a shock absorbing vehicle wheel and more particularly to that type of shock absorbing wheel which contains shock absorbing springs, which make it unnecessary so to construct the wheel as to provide air confined under pressure to absorb shocks.

It is an object of the invention to provide within the wheel a series of improved circumferentially arranged springs to serve effectively in the absorption of shocks both radially and circumferentially of the wheel, that is to say, shocks caused by passing over an uneven roadbed and shocks, and wheel strain caused by a sudden application of the brakes or sudden starting of the vehicle.

A more specific object is to provide in a shock absorbing wheel an improved arrangement of co-operating metallic springs with rubber or a rubber substitute in which said springs are firmly anchored, the springs which absorb radial shock and those which absorb circumferential shock being alternately arranged circumferentially of the wheel, thus imparting an efficient shock absorbing quality to all parts of the wheel.

Other objects, advantages and features of invention will hereinafter appear.

Referring to the accompanying drawing, which illustrates a preferred embodiment of the invention, Fig. 1 is a view showing the greater part of the wheel sectioned on line 1—1 of Fig. 2, and the upper part thereof in elevation, an intermediate portion being broken out to contract the view.

Fig. 2 is a fragmentary view showing a sector of the wheel partly in side elevation and partly sectioned along the midwidth of the wheel.

Fig. 3 is a fragmentary radial section of the peripheral portion of the wheel on line 3—3 of Fig. 2.

Fig. 4 is a sectional detail on line 4—4 of Fig. 3.

Referring in detail to the drawing, the improved wheel therein shown has a substantial rim 5 which surrounds an annular disk 6, said rim having in its outer face a plurality of sockets 7 constituting spring seats spaced from each other circumferentially of the rim. Adjacent to its inner periphery said annular disk has through it a series of bolt openings to receive screw bolts 8 (one of which is shown in Fig. 1), surrounded by bushings 9, said bolts screwing into the wheel's hub 10.

The wheel is provided with a circumferential series of spaced apart helical shock absorbing springs 15 having inner, smaller ends seated in the aforesaid sockets 7 and outer ends seated in sockets 16 formed in shoes 17 which underlie the

2 rubber or rubber substitute tread portion 18 of the wheel.

In order to reduce noise and assist in shock absorption elastic pads 20 and 21, against which the ends of the springs 15 abut, are respectively fitted within the sockets 7 and 16. By preference and as shown these pads are cup shaped. They have their open sides directed toward the springs.

Each of said shoes 17 has at each end a pair of corner ears or lugs 22 which are directed toward the center of the wheel. In relation to the width of the wheel tread each of these ears carries an inwardly projecting ledge or shelf 23, a groove 24 and pad 24a in the inner face of the ear leads down to an underlying L-shaped rubber gasket 28a with one limb on said shelf and the other limb in said groove, at each side of the wheel.

Upon and between each aforesaid pair of ears 22 is concentrically mounted the spiral end partition 25 of a leaf spring 26, the inner (in relation to the wheel) end partition of each of these springs consisting of a substantially straight intermediate run 27 and a right angularly directed substantially straight terminal run 28. Each of these leaf springs is provided at the end of its coiled portion 25 with outwardly directed ears 30 which are contained within said grooves 24 and pads 24a, there being an elastic filling 31 within each of said grooves which cushions the contained ear on all sides. The aforesaid terminal run 28 of each spring 26, together with the adjacent part of its run 27, is embedded in an elastic cushion 32, these cushions filling a series of recesses 33 which extends along the outer face of the wheel rim 5.

As shown in Fig. 3, said leaf springs 26 are widened at their inner ends, and as shown in Fig. 2, of the pair carried by each shoe one has its terminal run 28 directed clockwise of the wheel and the other has said terminal run directed anticlockwise of the wheel. Each shoe 17 and the three springs associated therewith forms a shock absorbing unit, the drawing illustrating a wheel provided with twelve of these units, but a greater or less number may be used, if desired.

In order that the springs which have been described may perform their shock absorbing function it is necessary that the wheel tread 18 be so mounted as to be radially movable in relation to the wheel rim 5, and the means for thus mounting said tread will now be described. Said wheel tread has an integral side wall portion 35 which completes the tire. Ribs or equivalent tread markings 36 are formed upon the tread surface of this tire and said annular side wall is bowed outwardly as viewed in transverse section, and along its free inner edge is furnished with a lip 37 which slidably abuts the side of the rim 5 and by the edge portion of a side wall member 38 which is attached by screw bolts 39 to the aforesaid disk 6 in axially outwardly spaced relation to the latter.

Along the side thereof opposite to its aforesaid side wall portion 35 the tread 18 has an annular shoulder 40 this shoulder being overlapped by the outer edge portion of a clamping ring 41. Said clamping ring is made of a resilient metal, is somewhat outwardly bowed in transverse section and is tapered toward its free outer edge, where it is provided with a slightly thickened lip portion 42, which firmly grips, but is slightly slidable upon said shoulder 40. The inner edge portion of this clamping ring or annular plate is thickened at 43 where it is attached to the tire rim by screws 44.

It will be seen that by annularly spacing apart the rim and tread portions of the wheel and connecting them to each other by means of the structures which have been described a relative radial movement is permitted between the tread and rim and the intervening spring structures limit this movement and at the same time absorbs shocks resulting from encountering uneven roadbeds.

It is to be noted that the embedded end portions of the leaf springs 26 are directed circumferentially of the tire and the transverse dimension of each of them extends axially of the tire so that they present flat inner and outer faces to the cushioning material 32 in which they are embedded, therefore the embedded spring portions do not cut into the cushioning material when shocks are absorbed.

It is to be observed that each of the leaf springs 26 has a coiled lower (as viewed in Fig. 2) end portion and has its upper half shaped similarly to the upper part of the letter S. This upper part terminates, as aforesaid, in a substantially straight upper run 28 and, as has been stated, these runs, in the pair of springs 26 on each shoe, are directed oppositely in relation to the circumference of the wheel rim 5. This arrangement better adapts the springs 26 to resist, in both directions relative circumferential movement of the wheel rim and tire, so that sudden stopping or starting of the automobile will not unduly bend the aforesaid helical springs 15.

I claim:

1. A wheel having a rim and a disk surrounded by said rim, a tire about said rim disposed in spaced concentric relation thereto, said tire having a side wall extending radially inward from one side edge of its tread portion and having its inner edge portion overlapping a side face of said rim of the wheel, there being a shoulder about the tire at the outer side of its tread portion from said side wall, a resilient sealing ring having an inner edge portion in an attached abutting relation to the last mentioned side face of said rim and having an outer edge portion overlapping and gripping said shoulder, a clamping plate removably and adjustably connected with the aforesaid disk of the wheel and having its marginal edge portion overlapping and gripping the aforesaid inner edge portion of the aforesaid side wall of the tire and firmly gripping the same, rigid shoes embedded in the tread portion of said tire and spaced from each other circumferentially of the tire and constituting sections of an outer rim, and springs mounted between said shoes and confronting portions of the wheel rim and yieldably resisting movement of the tire and the outer rim relative to the wheel rim.

2. A wheel having a rim and a disk surrounded by said rim, a tire about said wheel having a tread portion spaced outwardly from said rim and an annular side wall extending from one side edge of said tread portion and having a free edge portion overlapping a side edge face of said wheel rim, a resilient clamping ring secured against the opposite side edge face of said wheel rim, said clamping ring having an outer edge portion overlapping and gripping the tread portion of the tire at the opposite side thereof from the aforesaid side wall, a clamping plate removably and adjustably connected with the aforesaid disk of said wheel and gripping the free edge portion of said annular side wall, and spring means between the wheel rim and the tread portion of said tire yieldably resisting movement of the tire relative to the wheel.

3. A wheel having a rim and a disk surrounded by said rim, a tire about said wheel having a tread portion spaced outwardly from said rim and a side wall along one side edge of said tread portion integral therewith and closing one side of the space between said rim and said tread portion and having its inner edge portion in an overlapping slidable relation to a side edge face of the wheel rim, a yieldable closure for the opposite side of the space between the tire tread and the wheel rim secured to the wheel rim and slidably overlapping the tread portion of the tire at the opposite side thereof from said side wall, and spring means resisting movement of the tread portion relative to the wheel rim, said spring means being located between said tread portion and wheel rim.

4. A wheel having a rim formed with circumferentially spaced spring seats, there being sockets in said rim spaced from opposite sides of each spring seat circumferentially of the wheel rim, elastic cushions in said sockets, a tire having a tread portion surrounding said wheel and spaced outwardly from said wheel rim, plates embedded in the inner face of said tread portion and constituting shoes disposed opposite the spring seats and constituting sections of an outer rim spaced from each other circumferentially of the tire, said shoes each having a spring seat alined with a companion spring seat of the wheel rim, ears projecting from said shoes, each shoe having its spring seat located midway its length and its ears near its opposite ends, helical springs extending radially of the wheel between the wheel rim and the shoes and each having its ends anchored by engagement with companion spring seats, and other springs extending between the wheel rim and said shoes and having outer ends anchored to the ears and inner end portions embedded in said cushions of the wheel rim and resisting movement of the tire circumferentially of the wheel as well as resisting the helical springs to resist movement of the tire and the shoes radially of the wheel.

5. The subject matter of claim 4, and said springs which have end portions embedded in said cushions being leaf springs and their embedded end portions extending circumferentially of the wheel with their transverse dimensions extending axially of the wheel.

6. A wheel having a rim formed with circumferentially spaced spring seats and with sockets spaced from the spring seats circumferentially of the rim, a tire having a tread portion surrounding said wheel and disposed in outwardly spaced concentric relation thereto, shoes carried by the tread portion of said tire opposite companion spring seats of the wheel rim and each having ears near its ends and a spring seat between its ears disposed in alinement with the companion spring seat of the rim, helical springs extending between the wheel rim and the shoes radially of the wheel and having inner and outer ends engaged with the companion spring seats of the rim and the shoes, coiled springs extending between the wheel rim and the shoes and having radially outer ends in relation to the wheel anchored to the ears of the shoes, and elastic cushions carried by recesses in said rim, the radially inward ends of said coiled springs being anchored in said cushions.

7. A wheel having a rim, a tire having a tread portion surrounding the rim and spaced outwardly therefrom in concentric relation to the wheel, shoes embedded in the inner surface of the tread portion of said tire, each shoe having ears projecting from its end portions towards the wheel rim, helical springs extending between the wheel rim and the shoes radially of the wheel and having inner ends anchored to the wheel rim and outer ends anchored to the shoes between said ears, and coiled springs extending between the wheel rim and the shoes and having inner ends anchored to the wheel rim and outer ends anchored to the ears, there being a said coiled spring mounted on each end portion of the individual shoes.

8. The subject matter of claim 7, and said coiled springs being leaf springs and the portion of each of them which is anchored to the wheel rim being shaped substantially like the upper part of the letter S.

9. The subject matter of claim 7 and said coiled springs being leaf springs and that end portion of each of them which is anchored to the wheel rim terminating in a substantially straight run which is directed circumferentially of the wheel and the width of which extends axially of the wheel.

10. The subject matter of claim 9, and one of said runs of the circumferentially adjacent coiled springs being directed clockwise of the wheel and the other of said runs anti-clockwise thereof.

11. The subject matter of claim 9 and a cushioning material carried by the wheel rim in which said substantially straight runs are embedded.

12. A wheel having a rim, a tire having a tread portion surrounding the rim and spaced outwardly therefrom in concentric relation to the wheel, shoes embedded in the inner surface of the tread portion of said tire, each shoe having ears projecting from its end portions towards the wheel rim, helical springs extending between the wheel rim and the shoes radially of the wheel and having inner ends anchored to the wheel rim and outer ends anchored to the shoes between said ears, and a coiled leaf spring interposed between the wheel rim and each end portion of each of said shoes, each of said ears having an internal radial groove which receives an edge portion of the adjacent terminal part of said leaf spring and a shelf toward which the end of said terminal part is directed.

13. The subject matter of claim 12 and an L-shaped elastic gasket underlying the terminal part of said leaf spring at each side of the wheel.

14. A wheel having a rim and a disk surrounded by said rim, a tire about said wheel having a tread portion spaced outwardly from said rim and a side wall along one side edge of said tread portion closing one side of the space between said rim and said tread portion and having its inner edge portion in an overlapping slidable relation to a side edge face of the wheel rim, said side wall providing a yieldable closure for the side of the space between the tire tread portion and the wheel rim at the opposite side thereof from said side wall, and spring means resisting movement of the tread portion relative to the wheel rim, said spring means being located between said tread portion and wheel rim, and including leaf springs having inner end portions attached to the wheel rim and coiled outer end portions, and means concentrically mounting said coiled spring portions beneath said tread portion.

JOHN K. BABLES.

References Cited in the file of this patent

UNITED STATES PATENTS

| Number | Name | Date |
| --- | --- | --- |
| 793,003 | Mathey | June 20, 1905 |
| 2,356,940 | Marison | Aug. 29, 1944 |
| 2,448,313 | Hughes | Aug. 31, 1948 |